Figure 1:
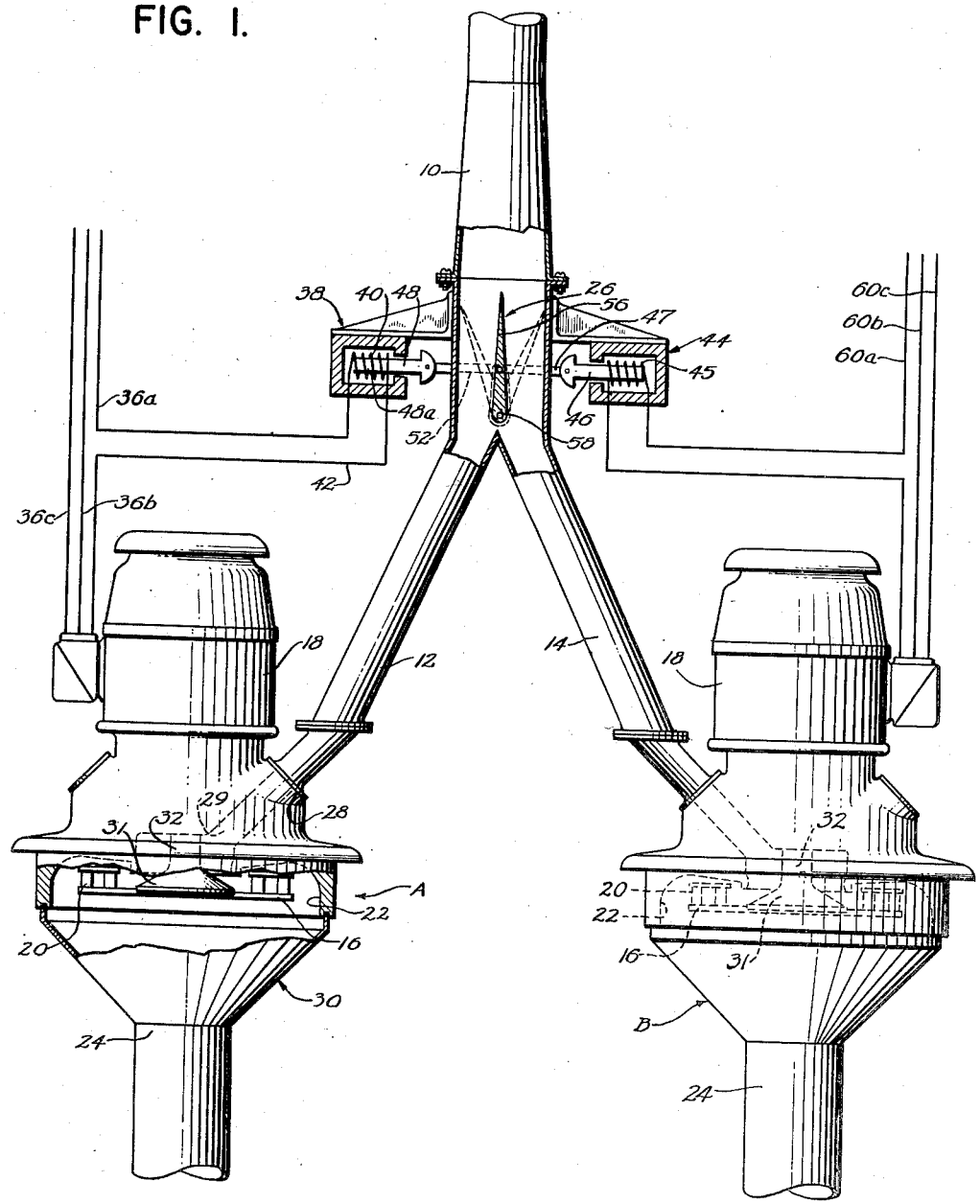

Sept. 22, 1953          R. B. DODDS          2,652,984
FLOW CONTROL APPARATUS FOR BULK PRODUCTS Filed May 5, 1949          2 Sheets-Sheet 1

INVENTOR
ROBERT B. DODDS
BY
Blair & Black
ATTORNEYS

Sept. 22, 1953  R. B. DODDS  2,652,984
FLOW CONTROL APPARATUS FOR BULK PRODUCTS
Filed May 5, 1949  2 Sheets-Sheet 2

INVENTOR
ROBERT B. DODDS
BY
Blair & Black
ATTORNEYS

Patented Sept. 22, 1953

2,652,984

UNITED STATES PATENT OFFICE 2,652,984

FLOW CONTROL APPARATUS FOR BULK PRODUCTS

Robert B. Dodds, Woodbridge, Conn., assignor to The Safety Car Heating & Lighting Company, Inc., New Haven, Conn.

Application May 5, 1949, Serial No. 91,511

5 Claims. (Cl. 241—135)

This invention relates to apparatus and a method for controlling the flow of a bulk particled material such as grain or the like. More particularly, where a bulk particled product is treated by a centrifugal machine, this invention contemplates regulating the amount of the bulk product which flows to the machine, in order to maintain a maximum degree of operating efficiency.

Accordingly, an object of this invention is to provide apparatus for controlling the flow of a bulk particled product to a centrifugal machine which treats the bulk product. Another object of this invention is to provide apparatus of the above character for preventing a centrifugal machine from being overloaded by controlling the rate of flow of the product to the machine. A further object is to provide apparatus of the above character which is simple in construction, easy to assemble and repair, and efficient in operation. Still another object of this invention is to provide apparatus of the above character which will prevent the rate of flow of such a product to a centrifugal treating machine from exceeding an upper limit. A still further object is to provide apparatus of the above character which will maintain a fixed ratio of flow of such product to two or more centrifugal treating machines. A further object is to provide a method for regulating the flow of a bulk product to a single centrifugal machine or a number of centrifugal machines. Other objects will be in part obvious and in part pointed out hereinafter.

The invention accordingly consists in the features of construction, combinations of elements and arrangements of parts and in the several steps and relation and order of each of the same to one or more of the others, all as will be illustratively described herein, and the scope of the application of which will be indicated in the appended claims.

Figure 2:
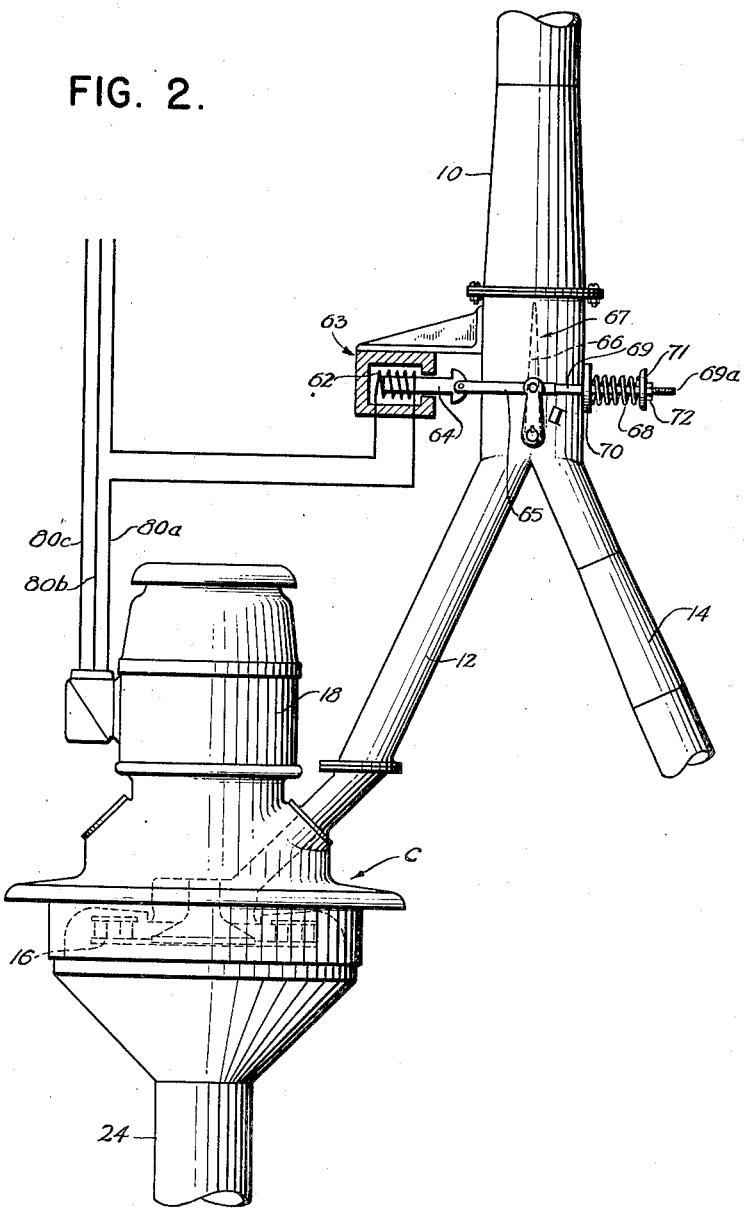

In the drawings:

Figure 1 is a diagrammatic view, partly in section, showing the mechanical and electrical components which form an embodiment of the invention; and Figure 2 is a diagrammatic view, partly in section, showing the mechanical and electrical components which form another embodiment of the invention.

Similar reference characters refer to similar parts throughout the views of the drawings.

In treating bulk particled products such as grain, the grain is generally treated in one or more centrifugal machines, where it may be subjected to such actions as insect destruction, milling, mixing, cleaning, etc. It is desirable to regulate the flow of product to these machines so that a maximum efficiency in operation is obtained. Thus, where only one machine is used, it is desirable to establish an upper limit for the flow of product to the machine. Where a plurality of machines are fed from a common source, the flow of product to the different machines should preferably be proportioned so that each machine carries an equal load.

This invention includes apparatus for regulating the flow of a particled bulk product to one or more centrifugal machines. The bulk particles flowing to the machine may include flour, grain or other foodstuffs as well as chemicals in a granulated state and, in fact, any material composed of a mass of individual particles. Illustratively, the particles may be impacted or milled as with grain or they may be scoured or infestation in a food product may be destroyed, or a number of other operations may be performed upon the particles by the centrifugal machines. However, for purposes of describing a specific embodiment, the centrifugal machines shown in the drawings are designed for the infestation destruction in a bulk product such as grain and are similar to the machine shown in Hulse Patent 2,339,737.

As shown in Figure 1, a bulk particled product such as grain flows down a main chute 10, which is bifurcated at its lower end to form the chute members 12 and 14. Accordingly, part of the grain flows down the chute 12 and the remainder down the chute 14. The grain flowing down the chute 12 is directed to the rotor 16 of a centrifugal machine, generally indicated at A. The construction of machine A may vary considerably according to the result desired, but Hulse Patent 2,339,737 discloses a representative example of such a machine used for insect destruction. Chute 14 leads to a machine B which is preferably identical with machine A and hence has similar reference characters applied to similar parts. Thus machines A and B have rotors 16 driven by motors 18, the rotors being located to receive the product flowing from chutes 12 and 14. Impactors 20 are circumferentially arranged in the rotors and thus as the product moves outwardly by centrifugal force it is impacted and finally strikes an annular wall 22, which deflects the particles downwardly into a hopper 24.

To control the amount of material flowing down the chute members 12 and 14 to machines A and B, respectively, a valve, generally indicated at 26, is located in the chute 10 directly above the chute members 12 and 14. The valve 26 is adjustably positioned in the chute by an electrical system, hereinafter to be described more fully, which determines the position of the valve according to the current flowing therethrough. The system is connected to the motors 18 of machines A and B so that the current flowing through each side of the system is proportional to the load upon the motor connected thereto. Since the load upon each of the motors is determined by the amount of the product flowing to each rotor 16, the valve 26 is adjustably positioned in accordance with the amount of material flowing to machines A and B. Assuming substantially the same characteristics for the machines A and B, as well as for each side of the electrical system associated with the machines, the valve 26 will be positioned so that the same amount of product flows to each machine.

More particularly, the bulk product such as grain flows down the chute 10 and is split up by the chutes 12 and 14 to flow to the treating machines A and B, respectively. The chute 12 extends from the chute 10 through a hole 28 in a casing generally indicated at 30 and has an outlet 29 directly above the frusto-conical hub portion 31 of the rotor 16. The rotor 16 and hub portion 31 are connected by a shaft 32 to the motor 18, here shown as of the three-phase type and connected by bus bars 36a, 36b and 36c to a three-phase power source (not shown).

A solenoid, generally indicated at 38, has a coil 40 connected in series with the motor 18 and bus bar 36a to regulate the flow of grain to the rotor 16. Armature 48 of the solenoid 38 is connected to shaft 52 which is connected in chute 10 to a valve blade 56 of the valve assembly 26. The valve blade 56 is pivoted on a pivot pin 58 and thus its position is determined by the pull of the armature 48.

As previously stated, some of the grain flowing down chute 10 passes through the chute 14 to treating machine B which is identical in construction and operation with machine A. Thus machine B has a rotor 16 driven by a motor 18 connected by leads 60a, 60b and 60c to a three-phase power source (not shown). A solenoid, generally indicated at 44, is connected in series with bus bar 60a and motor 18 and is substantially identical in its operating characteristics to the solenoid 38. The solenoid has a coil 45 and an armature 46 connected to a shaft 47, the shaft in turn being connected to valve blade 56.

In operation the product flows down the main chute 10 and the chute members 12 and 14 to machines A and B. In passing through the machines a load is imposed on the motor 18 which is proportional to the amount of the product flowing to each rotor 16. Also the current flowing to each motor is proportional to the load, i. e., the greater the flow of product to the rotor, the more current flows to the motor. Since coils 40 and 45 are in series with the motors, the currents therethrough are proportional to the load on the respective motors. Thus the load on each motor determines the force exerted by each coil upon its armature and consequently upon the valve blade 56. For example, suppose the flow through chute member 12 is increased. The load on motor 18 of machine A is increased, thereby increasing the current through coil 40 and consequently the pull of solenoid 38. Thus blade 56 moves to the left to cut down the flow through chute member 12. The reverse action will take place when the flow through chute member 14 increases, thereby increasing the load on the motor of machine B.

Since the forces exerted by the solenoids 38 and 44 upon the valve blade 56 act oppositely, the position of the valve blade remains unchanged when the forces are equal. Accordingly in operation the solenoids soon locate blade 56 so that the flow becomes equalized between each machine. Any upsetting factor such as a product surge through one machine immediately relocates the valve member to again bring about the desired balanced load condition. Under some conditions it may be desirable to maintain an unequal flow to the machines. In such a case, the characteristics of the motor and the solenoid may be varied to achieve the desired flow characteristics.

As in Figure 1, apparatus is shown in Figure 2 for regulating the flow of product to a treating machine. However, the apparatus shown in Figure 2 establishes an upper limit for the amount of product flowing to the machine.

In this figure, a machine, generally indicated at C, is shown which is similar in construction and operation to machines A and B shown in Figure 1 and accordingly, similar reference characters are applied to similar parts. The product such as grain is directed through chute 12 to the rotor 16 which is driven by motor 18. Motor 18 has leads 80a, 80b and 80c connected to the usual power source. A coil 62 of a solenoid generally indicated at 63 is connected to the motor through lead 80a. The solenoid has an armature 64 connected by a shaft 65 to a pivotal valve blade 66 of a valve generally indicated at 67. The solenoid 63 exerts a force upon the valve 67 proportionate to the current flowing through the solenoid and motor 18.

In the embodiment shown in Figure 2, the product flowing through the chute 14 may be recirculated into the main chute 10 for later passage to impacting machine C or it may be directed to some other apparatus which subjects the product to an action other than impacting, mixing, etc.

In order to provide an upper limit for the rate of product flow to machine C, a spring 68 acts in opposition to the solenoid 63. The spring 68 is supported on a shaft 69 between collars 70 and 71 mounted thereon. Collar 71 is supported by a nut 72 and lock washer adjustably positioned on a threaded portion 69a of shaft 69.

As described above, the force which the solenoid 63 exerts upon the valve blade 66 is determined by the load on the motor 18, which of course is proportionate to the amount of product flowing to machine C. This force acts in opposition to the spring 68, causing the valve blade 66 to be pivoted to a certain position. As a result, the amount of product flowing to machine C remains constant, its value depending on the adjustment of the spring. Any change in the volume of product flowing through chute 10 changes the load on the motor to reposition the valve blade 66. This readjustment is such as to maintain the desired volume of flow through chute 12. Of course, when the amount of product available is less than this upper limit, the valve blade 66 will be located to allow all of the product to flow to machine C.

There is thus provided an apparatus and method for regulating the flow of a bulk particled product to one or more treating machines so that a maximum efficiency in the operation of the machines is obtained. It will thus be seen that the several objects hereinabove referred to have been carried out in a practical and economical manner.

Since many possible embodiments may be made of the mechanical and electrical features of the above invention and since the art herein described may be varied in different parts, all without departing from the scope of the invention, it is to be understood that all matter hereinbefore set forth or shown in the accompanying drawings is to be interpreted as illustrative and not in a limiting sense.

What is claimed is:

1. In apparatus for maintaining a constant proportion between the flow of a bulk product to a pair of treating chambers, means forming said treating chambers, a motor-driven rotor in each of said chambers, means for guiding said product to said chambers, a valve positioned in said guide means to vary the flow of the product to one chamber in accordance with the flow to the other chamber, and electromagnetic means associated with said rotors and acting upon said valve to maintain the predetermined ratio of product flow to said chambers.

2. In apparatus for maintaining a constant proportion between the flow of a bulk product to a pair of treating chambers, the combination of, a pair of casing structures defining said treating chambers, a rotor in each of said casing structures and having a plurality of impactors circumferentially arranged therein, an electric motor for driving each of said rotors, means directing said bulk product from a common source to each of said rotors, a valve adjustably positioned in said directing means to vary the flow of grain to said chambers, and electromagnetic means including a pair of armatures respectively connected in the circuits of said motors and to said valve means and acting upon said valve means in opposition to each other in accordance with the loads upon the respective rotors and accordingly upon said motors, whereby said armatures proportionately position said valve means.

3. In apparatus for maintaining a constant proportion between the flow of a particled bulk product to a pair of treating chambers, the combination of, a pair of casing structures each defining a treating chamber, a rotor in each chamber having a plurality of impactors circumferentially arranged therein, each of said casing structures defining an impacting wall surrounding said rotor, a motor to drive the rotor, the current flowing through each motor being dependent upon the amount of product flowing to its associated rotor, means directing said product from a common source to each of said rotors, a valve associated with said last-mentioned means to control the flow of said product to said rotors, and electro-responsive means associated with each motor and adapted to be energized in accordance with the load thereon, said electro-responsive means having a pair of armatures connected to said valve and opposing each other whereby said valve is positioned to maintain a proper proportion of product flow to said treating chambers.

4. In flow control apparatus for maintaining the flow of a particled bulk product to a treating machine within predetermined limits, the combination of, a motor, a rotor driven by said motor and having a plurality of impactors circumferentially arranged therein, a first chute for directing said particled product from a primary source to said rotor, a second chute connected to said primary source to divert excess product from said rotor, a valve having a valve blade adjustably positioned to control the opening to said first and second chutes, electromagnetic means connected to said motor and including an armature connected to said valve blade whereby said armature acts upon said valve blade in accordance with the amount of material flowing to said rotor, and a spring acting upon said valve in opposition to said electromagnetic means to establish a maximum flow of grain to said rotor, said electromagnetic means being continuously energized and said spring constantly opposing said electromagnetic means during operation of said motor.

5. In apparatus of the character described, in combination, a pair of produce treating machines each including a chamber having a rotor disposed therein, an electric motor for driving each of said rotors, a chute connected to each of said chambers for directing flowable produce thereto, a common conduit connected to said chutes for supplying produce thereto, a valve in said conduit adjacent the point of connection between said chutes and said conduit and positionable to regulate the flow of produce from said conduit to said chutes, and means responsive to the load on each of said rotors and accordingly on each of said motors for adjusting said valve proportionately to said loads to compensate for variations in said loads thereby to maintain the flow to each rotor at a substantially constant value.

ROBERT B. DODDS.

References Cited in the file of this patent

UNITED STATES PATENTS

| Number | Name | Date |
| --- | --- | --- |
| 459,075 | Gray | Sept. 8, 1891 |
| 1,395,089 | Burhaus | Oct. 25, 1921 |
| 1,407,330 | Hiller | Feb. 21, 1922 |
| 1,450,720 | Gassman | Apr. 3, 1923 |
| 1,599,593 | Smith | Sept. 14, 1926 |
| 1,742,434 | Costello | Jan. 7, 1930 |
| 2,111,663 | Graemiger | Mar. 22, 1938 |
| 2,157,775 | Smith | May 9, 1939 |